US 8,733,938 B2

(12) United States Patent
Sachdev et al.

(10) Patent No.: US 8,733,938 B2
(45) Date of Patent: May 27, 2014

(54) VIRTUAL CONVERTIBLE TOPS, SUNROOFS, AND BACK WINDOWS, AND SYSTEMS AND METHODS FOR PROVIDING SAME

(75) Inventors: Anil K. Sachdev, Rochester Hills, MI (US); Mark W. Verbrugge, Troy, MI (US); Byron T Shaw, Portola Valley, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 13/414,126

(22) Filed: Mar. 7, 2012

(65) Prior Publication Data

US 2013/0235351 A1 Sep. 12, 2013

(51) Int. Cl.
G03B 21/00 (2006.01)

(52) U.S. Cl.
USPC ............. 353/13; 353/10; 353/11; 353/12; 353/69; 353/70; 359/865; 348/148

(58) Field of Classification Search
USPC ............. 353/10–13, 15, 22, 30, 46, 70–71; 348/148, E07.085, E07.087; 349/5, 349/7–11; 359/13, 865
See application file for complete search history.

(56) References Cited

U.S. PATENT DOCUMENTS

| 7,520,616 | B2 | 4/2009 | Ooba et al. | |
|---|---|---|---|---|
| 2003/0151563 | A1 | 8/2003 | Kulas | |
| 2004/0189947 | A1* | 9/2004 | Hattori et al. | 353/13 |
| 2006/0146552 | A1* | 7/2006 | Shaffer | 362/465 |
| 2006/0198626 | A1* | 9/2006 | Nakamura et al. | 396/234 |
| 2007/0081262 | A1 | 4/2007 | Oizumi et al. | |
| 2008/0204557 | A1 | 8/2008 | Kubota et al. | |
| 2009/0086019 | A1 | 4/2009 | Okabe et al. | |
| 2009/0201173 | A1 | 8/2009 | Okabe et al. | |

FOREIGN PATENT DOCUMENTS

| EP | 1285814 | 2/2003 |
|---|---|---|
| EP | 1878618 | 1/2008 |
| EP | 1974998 | 10/2008 |
| GB | 2417847 | 3/2006 |
| GB | 2408874 | 6/2006 |
| GB | 2457034 | 8/2009 |
| JP | 5139210 | 6/1993 |
| JP | 2004064131 | 2/2004 |
| JP | 2005125828 | 5/2005 |
| JP | 2005184225 | 7/2005 |
| JP | 2008250453 | 10/2008 |
| TW | 200821196 | 5/2008 |

* cited by examiner

Primary Examiner — Sultan Chowdhury
(74) Attorney, Agent, or Firm — Parks IP Law LLC; Mickki D. Murray, Esq.

(57) ABSTRACT

A virtual-sunroof system for providing a virtual sunroof at an interior of a vehicle for viewing by a passenger of the vehicle. The system includes a virtual-sunroof imaging device configured and arranged at the vehicle to collect image information from an environment above the vehicle and create digital image data using the image information. The system also includes a virtual-sunroof projection device configured and arranged in the vehicle to be in communication with the virtual-sunroof imaging device for providing a virtual sunroof display. The virtual sunroof display provided (a) is viewable above a head of the passenger, (b) is formed using the image data, (c) represents accurately at the interior of the vehicle a rendition of the environment above the vehicle, and (d) has a size, shape, and location corresponding generally to a size, shape, and location that an actual conventional-type sunroof would have in the vehicle.

20 Claims, 9 Drawing Sheets

VIRTUAL CONVERTIBLE TOPS, SUNROOFS, AND BACK WINDOWS, AND SYSTEMS AND METHODS FOR PROVIDING SAME

TECHNICAL FIELD

The present disclosure relates generally to virtual convertible tops, virtual sunroofs, and virtual back windows and, more particularly systems and methods for providing the same for use in automobiles.

BACKGROUND

Convertible tops and sunroofs provide occupants of a vehicle with views of the environment above the vehicle. Convertible tops—i.e., retractable or removable roofs, and sunroofs are popular vehicle features because people enjoy the openness of being able to see what is above the vehicle.

Heretofore, though, these benefits have come with inherent downsides. A vehicle having no top, or its top in a down position, has less body structure. The decreased structure affects ride and handling.

As another example, a vehicle lacking a roof protects occupants less from external forces in the event of an accident, compared to a vehicle having an integral roof. Even if a convertible vehicle has its top up, the top is generally less stiff than an integral roof, and so ride, handling, and overhead protection can be diminished. Convertible tops, rear windows, and sun roofs also do not seal the vehicle from external noise and moisture as well as a vehicle having a contiguous integral roof and rear panel.

Particular to sunroofs and rear windows, the glass they usually include does not have the structural properties of materials such as steel and aluminum used for the structural roof components and can shatter during an accident. Also, glass is much heavier than other vehicle materials, such as steel, and so sunroofs add undesirably to an overall vehicle weight. Rear windows are also prone to these shortcomings.

Accordingly, there is a need for a system allowing vehicle users to experience many attributes of convertible tops, rear windows, and/or sunroofs without the shortcomings usually accompanying them.

SUMMARY

The present disclosure relates to a virtual-sunroof system for providing a virtual sunroof at an interior of a vehicle for viewing by a passenger of the vehicle. The system includes a virtual-sunroof imaging device configured and arranged at the vehicle to collect image information from an environment above the vehicle and create digital image data using the image information. The system also includes a virtual-sunroof projection device configured and arranged in the vehicle to be in communication with the virtual-sunroof imaging device for providing a virtual sunroof display. The virtual sunroof display (a) is viewable above a head of the passenger, (b) is formed using the image data, (c) represents accurately at the interior of the vehicle a rendition of the environment above the vehicle, and (d) has a size, shape, and location corresponding generally to a size, shape, and location that an actual conventional-type sunroof would have in the vehicle.

In another aspect, the present disclosure describes a virtual-convertible-top system for providing a virtual convertible top at an interior of a vehicle for viewing by a passenger of the vehicle. The virtual-convertible-top system includes a virtual-convertible-top imaging device configured and arranged at the vehicle to collect image information from an environment above the vehicle and create digital image data using the image information. The system also includes a virtual-convertible-top projection device configured and arranged in the vehicle to be in communication with the virtual-convertible-top imaging device for providing a virtual-convertible-top display. The virtual-convertible-top display (i) is viewable above a head of the passenger, (ii) is formed using the image data, and (iii) represents accurately, at the interior of the vehicle, a rendition of the environment above the vehicle.

In still another aspect, the present disclosure provides a non-transitory computer-readable storage medium having instructions that, when executed by a processor, cause the processor to perform a method for providing a virtual overhead display for viewing by a passenger of a vehicle. The method includes receiving overhead image data from an imaging device. The method also include processing the overhead image data to form processed overhead image data. The method further includes providing the processed overhead image data to a display device for use by the display device to provide the virtual overhead display to be viewable by the passenger of the vehicle.

Other aspects of the present technology will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure. For example, any two or more elements described separately could be combined into a single element, and vice versa.

OVERVIEW OF THE DISCLOSURE

In various embodiments, the present disclosure describes virtual convertible tops, virtual sun or moon roofs (sunroof, hereafter), virtual back windows, and system and methods for providing the same. The systems and methods are described herein primarily in connection with automobiles, but the technologies of the present disclosure are not limited to use with automotive vehicles. The virtual convertible tops, virtual sunroofs, and virtual back windows described herein can be implemented in a wide variety of applications including in, for example, aircraft and marine vehicles.

Conventional Vehicles

Figure 1:
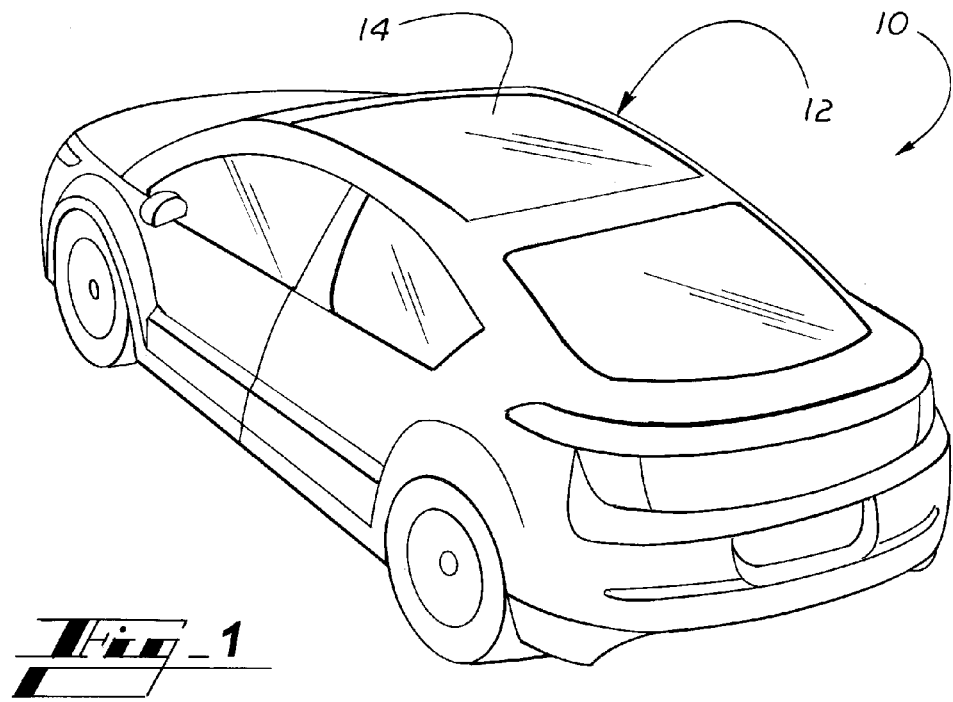
FIG. 1 shows a conventional automobile having an integral top.

Most conventional vehicles include integral tops. Now turning to the figures, and more particularly to the first figure, FIG. 1 shows a conventional vehicle 10 including an integral top 12. Some integral tops include a sun, or moon roof 14, as shown in FIG. 1.

Figure 2:
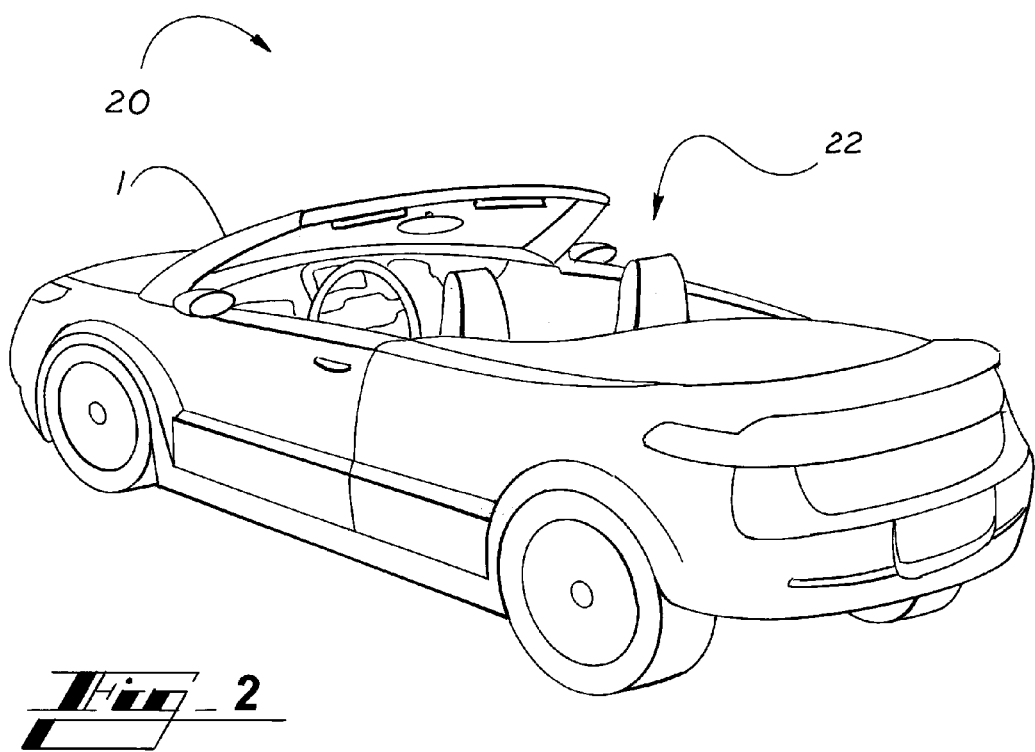
FIG. 2 shows a convertible automobile having its top down (retracted or removed).

Some conventional vehicles include convertible tops. These cars can be converted from a topped or covered mode to a convertible or uncovered mode by retracting or removing the top (roof). FIG. 2 shows a convertible vehicle 20 with its top retracted or removed. Accordingly, its interior 22 is exposed to the elements.

Conventional vehicles having convertible tops and/or sunroofs suffer from drawbacks including those identified above.

Figure 3:
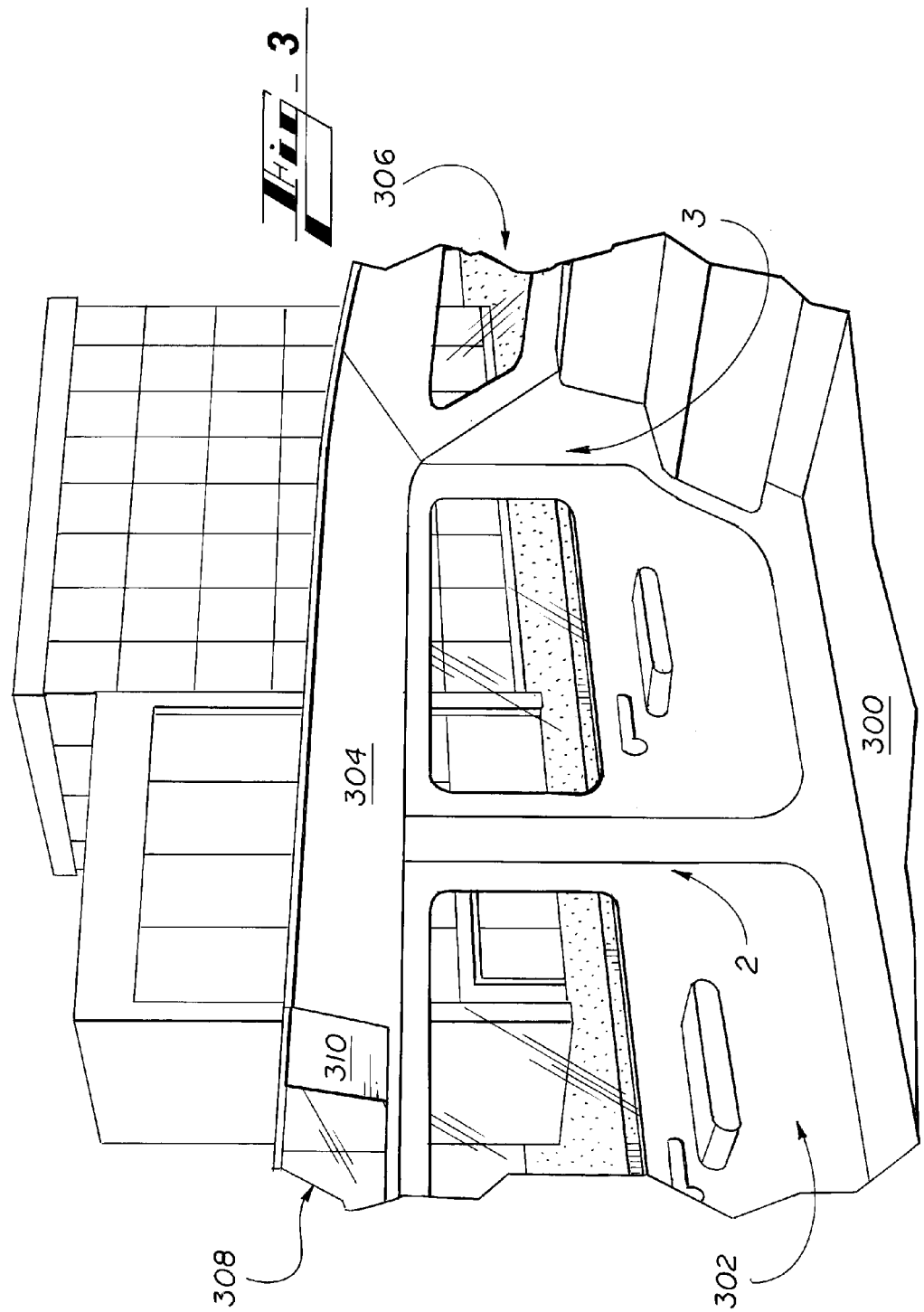
FIG. 3 is a rear and lateral-facing view of an interior of an automobile.

FIG. 3—Rear-Facing View of Vehicle Interior

FIG. 3 is a lateral and rearward-facing view of an interior 302 of a vehicle 300. The interior 302 includes a ceiling 304 and a rear panel 306. In some embodiments, the rear panel includes a window, such as a conventional glass pane. In other embodiments, the rear panel 306 is an opaque panel, such as one comprising a sheet of metal from side to side.

Example materials for the rear panel 306 include, glass, sheet metal, and aluminum. The panel 306 can be covered and trimmed much like most ceilings 304 are covered and trimmed, including by having similar or the same materials covering and trimming the ceiling 304.

Although most vehicles have a transparent rear panel 306 (i.e., window), the rear panel of many vehicles (e.g., security vans) do not. An opaque rear panel 306 can be selectively made transparent virtually, according to the present technology.

In some embodiments, the ceiling 304 includes a conventional sunroof 308. In particular embodiments, the sunroof assembly 308 includes a slidable interior cover 310 (shown between an open and closed position in FIG. 3). The cover 310 can leave the ceiling 304 looking generally like a ceiling of a vehicle lacking a sunroof, or at least render it functioning similarly or the same as a ceiling not having a sunroof for the purposes of the present technology.

The vehicle 300 using the technology of the present disclosure in some embodiment includes a traditional convertible top, wherein a roof thereof, comprising the ceiling 304, can be retracted or removed, such as shown in FIG. 2.

Figure 4:
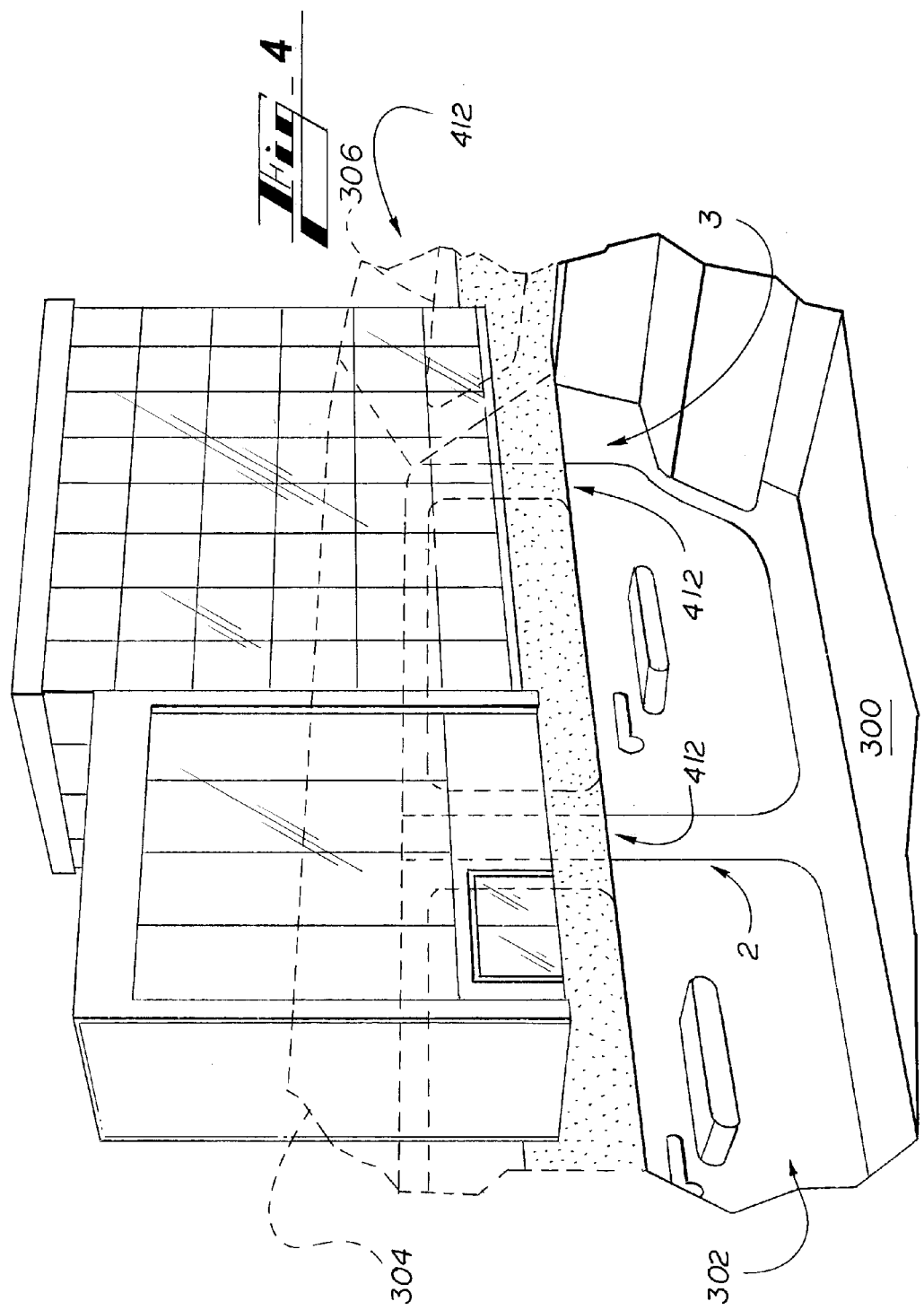
FIG. 4 is the view of FIG. 3 with the automobile in a virtual convertible mode.

FIG. 4—Rear-Facing View in Virtual Convertible Mode

A virtual convertible effect is formed by presenting to vehicle occupants an image 412 in, on, and/or in front of one or more parts of the interior 302 of the vehicle 300, including the ceiling 304. An example image 412 is shown in FIG. 4. The image 412 may be formed in a variety of ways without departing from the scope of the present technology. As will be described below in further detail, ways of creating the image 412 include projection onto a surface, displaying from a screen, and holography—e.g., displaying a holographic image in front of the surface.

While the image is referred to herein by the same reference numeral 412 in connection with multiple vehicle components and embodiments of the present technology, the common numbering protocol is used to simplify the present disclosure, as the image need not be, and usually is not, the same at all of the interior vehicle surfaces over which, on which, or in which it 412 is displayed.

In one embodiment, it is preferred that the image 412 provide a real-time representation of the actual environment above the vehicle 300, such as by displaying data received from one or more imaging devices recording the actual environment above the vehicle. The imaging device system is described further below in connection with FIG. 8.

In a contemplated embodiment, the image 412 depicts something other than the actual surroundings of the vehicle 300. In these cases, the image 412 is stored in, received by, and or generated by a processing system onboard the vehicle 300. An example processing system or controller 1000 is described below in connection with FIG. 10. The processing system could be dedicated to controlling virtual images and related functions, or could be part of a system also affecting other vehicle components. For example, the processing system could be a part of a vehicle control unit (VCU).

An example of an image 412 showing something other than actual vehicle surroundings is a starry sky, which can be displayed during a night in which many stars are not visible to the naked eye.

The image 412 can cover most any portion of the vehicle 300. As shown in FIG. 4, the image 412 can cover any or all of the ceiling 304, a second, or B pillar (2), a third, or C pillar (3), and the rear panel 306. The image 412 can also be generated and projected to cover any trim or other intermediate material, such as material present between windows and pillars and between windows and the ceiling, thereby rendering the image and window views, together, contiguous, as shown in FIG. 4.

The image 412 displayed on the B pillar (2), C pillar (3), and the rear panel 306 depict the actual surroundings of the vehicle 300 beyond those components. That is, the image 412 is presented on the B pillar (2), C pillar (3), and rear panel 306 so that a view available to occupants, including the driver (e.g., via a rear view mirror), is as if there were, respectively, no B pillar (2), C pillar (3), or rear panel 306 at all. The view created by the image 412 is thus as if the vehicle 300 (I) was a convertible vehicle (which it may be) and (II) had its top down, while the top is actually up.

Figure 5:
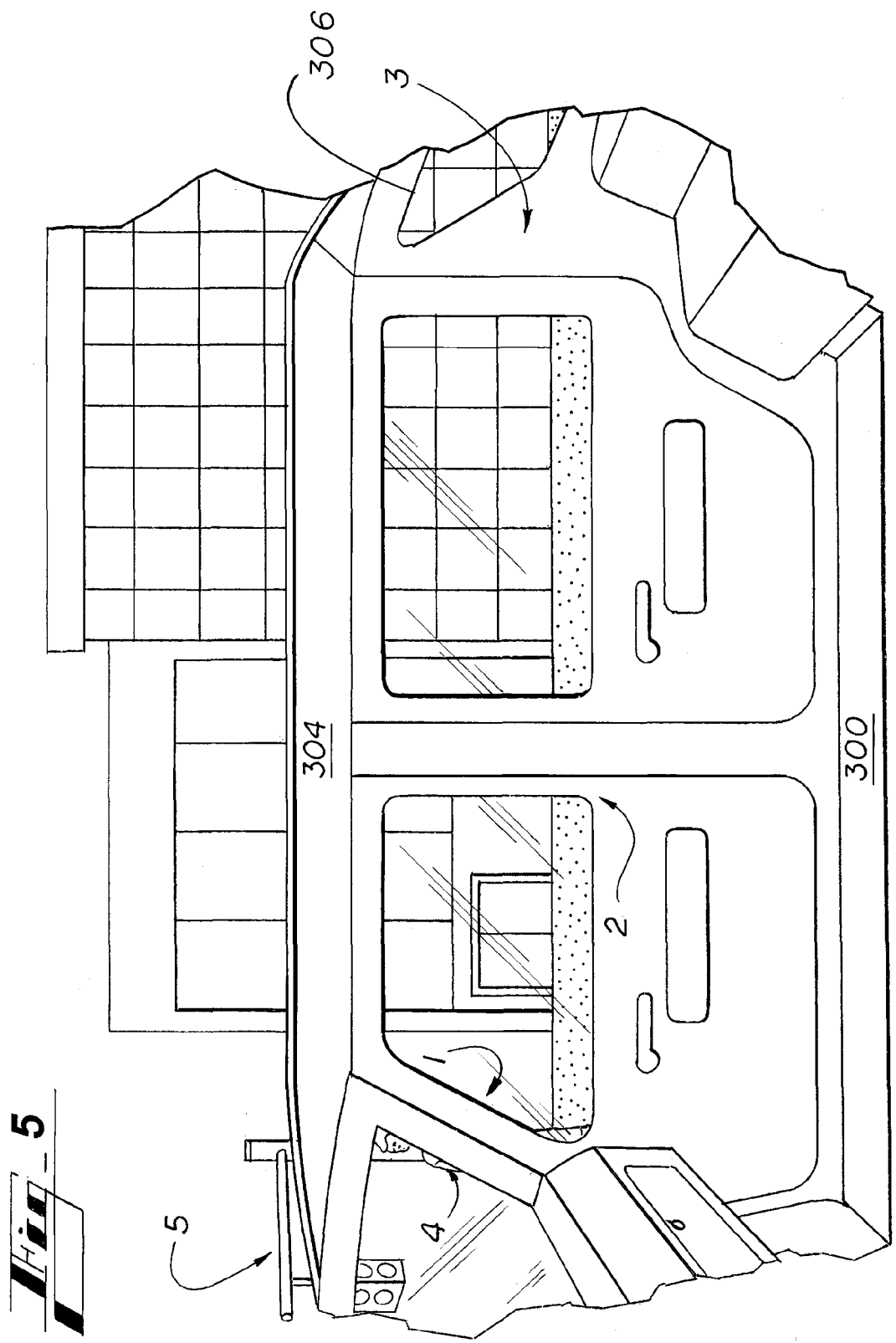
FIG. 5 is a lateral-facing view of the interior of the automobile of FIGS. 3 and 4 while it is not in a virtual mode.

FIG. 5—Lateral View of Vehicle Interior

FIG. 5 shows a lateral-facing view of the interior of the vehicle 300 (sans sunroof 308) with the virtual convertible feature turned off. The vehicle 300 includes a first, or A pillar (1) and the B pillar (2). The ceiling 304 is visible in FIG. 5.

Figure 6:
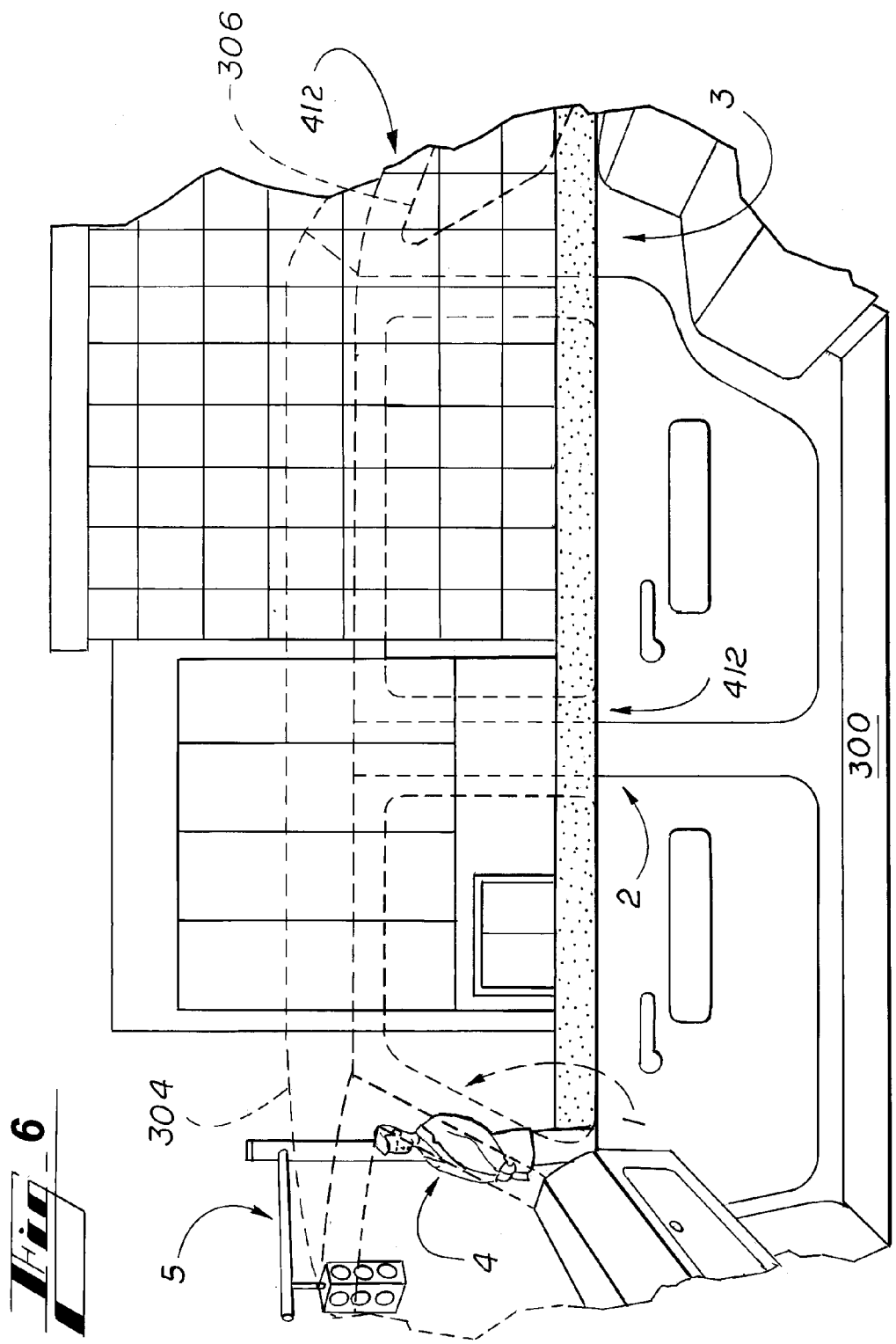
FIG. 6 is the view of FIG. 5 with the automobile in a virtual convertible mode.

FIG. 6—Lateral View in Virtual Convertible Mode

FIG. 6 shows the view of FIG. 5 with the virtual convertible feature turned on. The ceiling 304 is also visible in FIG. 6, just shown displaying the image 412.

As with the B pillar (2) and the C pillar (3), the image 412 displayed on the A pillar (1) depicts the actual surroundings of the vehicle 300 as it exists beyond the A pillar (1). The image 412 is presented on, in, or in front of the A pillar (1) so that a view available to occupants is as if there were no A pillar (1) at all.

Presenting the image 412 including the beyond-pillar view on any or all of the pillars has benefits including fostering an open feeling for occupants of the vehicle 300. Another benefit is eliminating blind spots typically created by the pillars.

A pillars (1) are typically present in convertible vehicles (see e.g., the vehicle 20 in FIG. 2). They are especially typical in modern vehicles for securing the windshield. Nonetheless, the image 412 can be formed on the A pillar (1), as well. Forming the image 412 on the A pillar (1) further increases the openness and view for the occupants, and eliminates the corresponding blind spot.

As examples of actual objects that can be viewed by way of the image 412 displayed on the ceiling 304 [please show ceiling like in FIG. 4] and A pillar (1), FIG. 6 shows a person 4 and a traffic light 5, on the respective surfaces of the vehicle 300, whom and which were not readily discernable without the virtual features of the present technology, as can be seen by previous FIG. 5.

Figure 7:
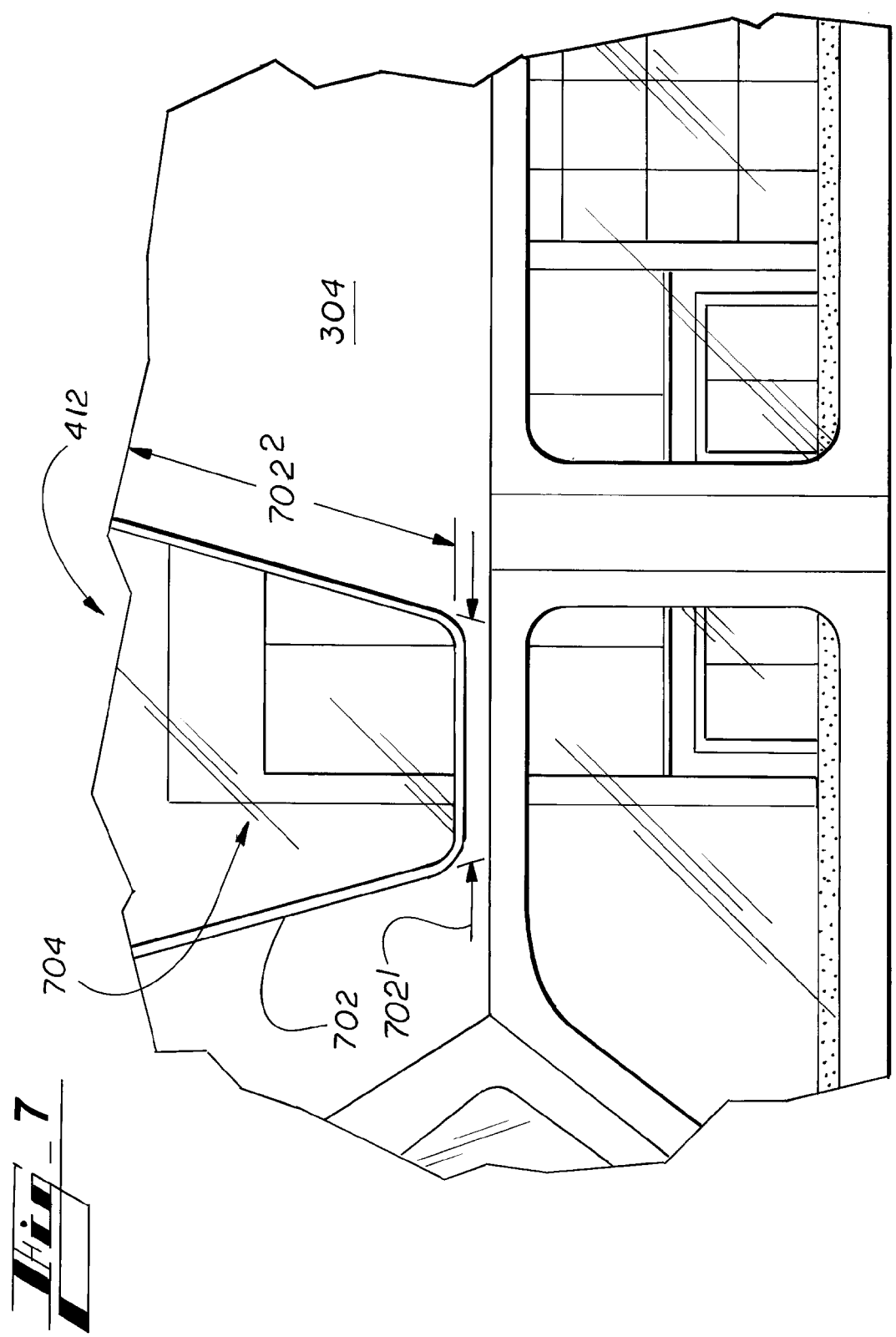
FIG. 7 is a view of the interior of the vehicle, being in a virtual sun/moon roof mode.

FIG. 7—Virtual Sunroof

FIG. 7 shows another view of the interior of the vehicle 300. In this embodiment, the image 412 forms a virtual sunroof.

As shown in FIG. 7, the image 412 can include various details of an actual sunroof, including simulated sunroof trim 702 and, when the virtual sunroof is "closed," simulation of glass 704—e.g., streak marks and reflection marks at the simulated glass material that would be due to sun light, building lights, street lights, etc.

The image 412 for the virtual sunroof may have any of a wide variety of sizes and shapes without departing from the scope of the present technology. For instance, in one embodiment, the image 412 forming the virtual sunroof has a length $702^1$ of between about 14 inches and about 20 inches and a width $702^2$ of between about 27 inches and about 40 inches. In some cases, the virtual sunroof extends laterally to, or almost to, edges of the ceiling 304. In some cases, the virtual sunroof extends lengthwise to, or almost to, a front-most edge of the ceiling 304 and/or a rear-most edge of the ceiling 304.

Figure 8:
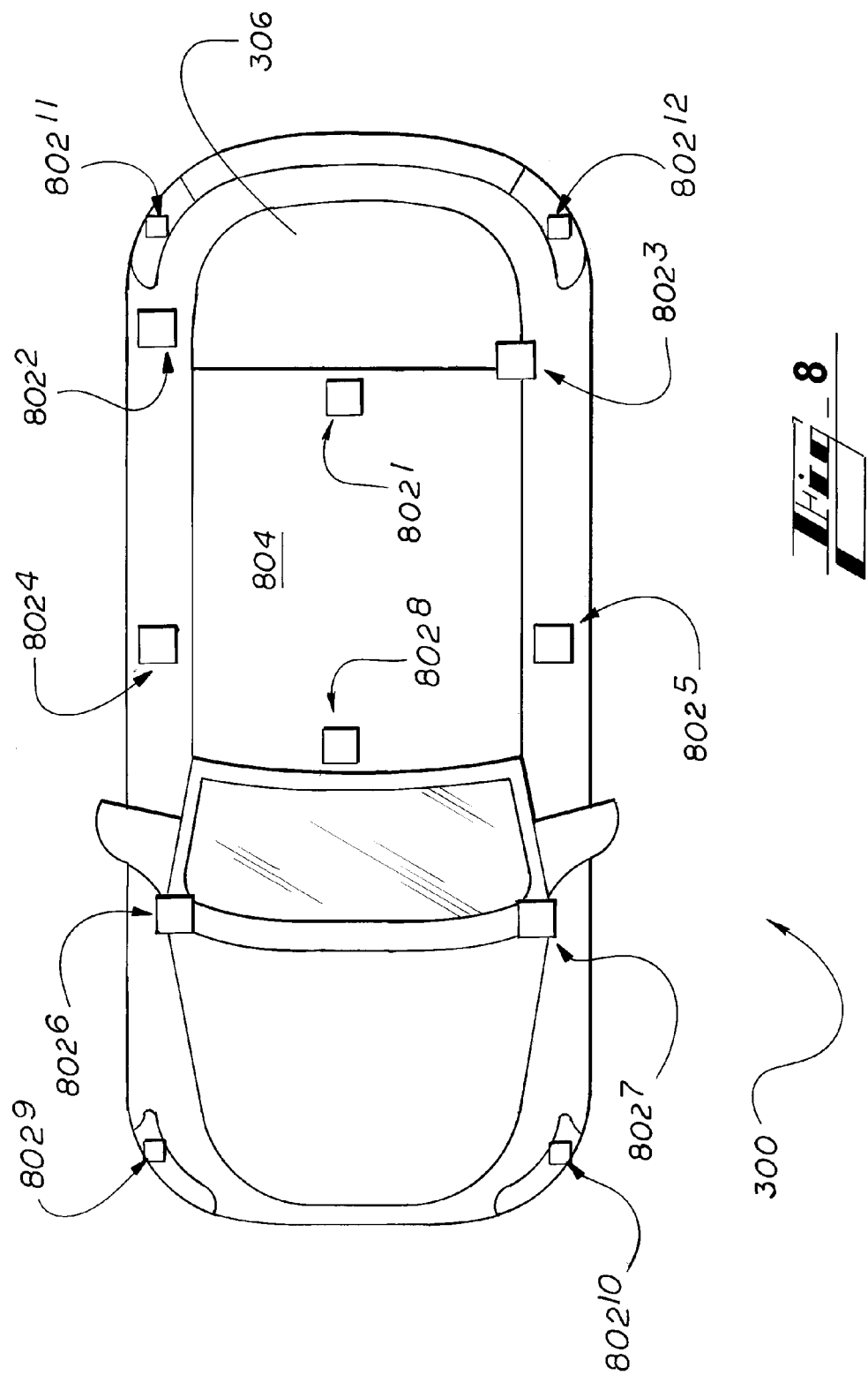
FIG. 8 is a plan view of the automobile showing locations of imaging devices used to collect images for virtual convertible tops, virtual sun/moon roofs, and virtual back windows of the present technology.

FIG. 8—Imaging Device Locations

FIG. 8 shows a plan view of the vehicle 300. In some embodiments, the vehicle 300 includes one or more cameras and/or other 2D or 3D imaging devices 802. Although the number and location of the imaging devices is not limited by the present disclosure, FIG. 8 shows eight (12) imaging devices $802^1$-$802^{12}$ positioned at various locations of the vehicle 300. These devices are described in more detail below.

Output data signals from the imaging devices 802 are in some embodiments transmitted directly to display components (e.g., display screen(s) or projector(s)). In some embodiments, the signals are transmitted to a controller, such as the controller 1000 described below in connection with FIG. 10. As described there, the controller can be configured to perform acts such as image-device (e.g., camera) control, signal processing, data storage, image processing—e.g., cropping and adjusting size, brightness, colors, and the like. In one embodiment, all or one or more of these functions are performed at the imaging device and/or display component.

Data sent from the imaging devices 802 and/or the data sent to display components can be sent by wire(s) and/or wirelessly—using, e.g., BLUETOOTH® or other short-range communication protocol.

A wide variety of imaging devices may be used with the present technology. Example types include standard charge coupled device (CCD) cameras, infra-red cameras, LIDAR (Light Detection And Ranging) cameras, RADAR (Radio Detection And Ranging) cameras, any imaging devices that can convert an image to a digital signal, the like, etc.

As provided above, any two or more elements described separately herein can be combined into a single element, and vice versa. Regarding imaging devices, two or more imaging devices can replace any imaging device described for simplicity below in a singular sense. For instance, the vehicle can include two or more sky imaging devices, recording an above vehicle environment. Similarly, a single imaging device could collect visual data for use in connection with both C pillars, as described below.

Rear Panel Imaging Device

A rear-panel imaging device $802^1$ (e.g., camera) can be positioned at the central rear location, such as on or adjacent the rear panel 306. A purpose of this imaging device $802^1$ is to generate data signals for use in providing the image 412 that is to be displayed on, in, or in front of the interior of the rear panel 306 (as shown in FIG. 4). While this imaging device $802^1$ may be positioned in other locations with as much success, in one embodiment it is preferred that the imaging device be positioned on or adjacent rear panel 306 because it can from this position collect images from exactly the perspective of the rear panel 306. More particularly, this imaging device $802^1$ is in some cases, but need not be, generally centrally located, as shown in FIG. 8.

The imaging device $802^1$ can be directed as desired, such as by being directed in generally an aft direction (rearward) of the vehicle 300. In one embodiment, the direction of the imaging device is determined based at least in part on the view of the driver. For instance, the because the driver is sitting offset, to one side of the vehicle 300, and toward the front, the imaging device $802^1$ can have a corresponding offset in its direction so that the view for the driver viewing the image 412 is the same as or closer to what the driver would see in an actual top-down scenario, or as if there is a rear window.

The effective direction of this and all of the imaging devices described herein is in some embodiments changeable without need to move a body of the imaging device. For example, the imaging devices can be configured such that a lens portion of the imaging device can be changed, such as in response to instruction from a controller (e.g., the processor 1102 described in connection with FIG. 10) and/or from a vehicle user.

The images 412 displayed on, by, or in front of the interior of the rear panel 306 would depict accurately a view from the rear panel—i.e., a view for the occupants showing the beyond-panel environment, as if the panel was not present.

C-Pillar Imaging Devices

C-pillar imaging devices $802^2$, $802^3$ (e.g., cameras) are in some embodiments positioned at respective rear lateral locations of the vehicle 300. A purpose of these imaging devices is to generate data signals for use in providing the image 412 that is to be displayed on, in, or in front of the interior of the C pillars (3) (as shown in FIG. 4). While these imaging devices $802^2$, $802^3$ may be positioned in other locations of the vehicle 300 with as much success, in one embodiment it is preferred that these imaging devices be positioned on or adjacent the respective C pillars (3) because they can from there collect images from exactly the perspective of the C pillars (3).

These imaging devices $802^2$, $802^3$ can be directed as desired, such as by being directed at an angle between completely rearward and completely laterally. In one embodiment, the directions of the imaging devices are determined based at least in part on the view of the driver. For instance, the because the driver is sitting offset, to one side of the vehicle 300, and toward the front, the imaging devices $802^2$, $802^3$ can have corresponding offsets in their direction so that the view for the driver viewing the image 412 is the same as or closer to what the driver would see in an actual top-down scenario.

In these ways, the images 412 displayed on, by, or in front of the interior of the C pillar (3) would depict accurately a view from the pillar—i.e., a view for the occupants showing the beyond-pillar environment, as if the C pillars (3) were not present.

B-Pillar Imaging Devices

B-pillar imaging devices $802^4$, $802^5$ (e.g., cameras) are in some embodiments positioned at respective lateral positions of the vehicle 300. A purpose of these imaging devices is to generate data signals for use in providing the image 412 that is to be displayed on, in, or in front of the interior of the B pillars (2) (as shown in FIG. 6). While these imaging devices $802^4$, $802^5$ may be positioned in other locations with as much success, in one embodiment it is preferred that these two imaging devices be positioned on or adjacent the respective B pillars (2) because they can from there collect images from exactly the perspective of the B pillars (2).

These imaging devices $802^4$, $802^5$ can be directed as desired, such as by being directed in a generally lateral direction of the vehicle 300. In one embodiment, the directions of the imaging devices are determined based at least in part on the view of the driver. For instance, the because the driver is sitting offset, to one side of the vehicle 300, and toward the front, the imaging devices $802^4$, $802^5$ can have corresponding offsets in their direction, thereby being directed at an angle between directly laterally of the vehicle and in the aft (rearward) direction of the vehicle 300, so that the view for the driver, and in some embodiments, also for passengers sitting in the front and/or rear of the vehicle, viewing the image 412 is the same as or closer to what they would see in a vehicle lacking B pillars (2).

In these ways, the images 412 displayed on, by, or in front of the interior of the B pillar (2) would depict accurately a view from the pillar—i.e., a view for the occupants showing the beyond-pillar environment, as if the B pillars (2) were not present.

A-Pillar Imaging Devices

A-pillar imaging devices $802^6$, $802^7$ (e.g., cameras) are in some embodiments positioned at respective front lateral positions of the vehicle 300. A purpose of these imaging devices is to generate data signals for use in providing the image 412 that is to be displayed on, in, or in front of the interior of the A pillars (1) (as shown in FIG. 6). While these imaging devices $802^6$, $802^7$ may be positioned in other locations with as much success, in one embodiment it is preferred that these two imaging devices be positioned on or adjacent the respective A pillars (1) because they can from those locations collect images from exactly the perspective of the A pillars (1).

These imaging devices $802^6$, $802^7$ can be directed as desired, such as by being directed at an angle between completely laterally and completely forward of the vehicle 300. In one embodiment, the directions of the imaging devices are determined based at least in part on the view of the driver. For instance, the because the driver is sitting offset, to one side of the vehicle 300, and toward the front, the imaging devices $802^6$, $802^7$ can have corresponding offsets in their direction, thereby being directed at respective angles between directly laterally of the vehicle and in the forward direction of the vehicle 300, so that the view for the driver viewing the image 412 is the same as or closer to what the driver would see in a vehicle lacking A pillars (1). The same is true for passengers in some embodiments.

In these ways, the images 412 displayed on, by, or in front of the interior of the A pillar (1) would depict accurately a view from the pillar—i.e., a view for the occupants showing the beyond-pillar environment, as if the A pillars (1) were not present.

Ceiling Imaging Device(s)

A generally upward-facing, or sky-view, imaging device $802^8$ (e.g., camera) corresponding to the image 412 provided on the ceiling 304 of the vehicle 300 can, like the other imaging devices, also be positioned at any of various locations of the vehicle 300. In FIG. 8, the sky-view imaging device $802^8$ is positioned on or adjacent a top or roof 804 of the vehicle 300. A purpose of this imaging device $802^8$ is to generate data signals for use in providing the image 412 that is to be displayed on, in, or in front of the ceiling 304 (as shown in FIGS. 4, 6, and 7). These signals can be used for the virtual convertible mode and for the virtual sunroof mode.

While this imaging device $802^8$ may be positioned in other locations with as much success, in one embodiment it is preferred that the imaging device $802^8$ be positioned on or adjacent the roof 804 because it can from this position collect images from exactly the perspective of the roof 804. More particularly, the imaging device $802^8$ is in some cases, but need not be, generally centrally located, as shown in FIG. 8. In some embodiments, the imaging device $802^8$ is located to the left or right of a centerline of the vehicle roof 804, and in some cases all the way to the edge of the roof 804, or even positioned on a side of the vehicle 300, facing generally upward.

The imaging device $802^8$ can be directed as desired, such as by being directed generally upward of the vehicle 300. In one embodiment, the direction of the imaging device is determined based at least in part on the view of the driver. For instance, the because the driver is sitting offset, to one side of the vehicle 300, and toward the front, the imaging device $802^8$ can have a corresponding offset in its direction so that the view for the driver viewing the image 412 is the same as or closer to what the driver would see in an actual top-down or sunroof scenario. In some embodiments, the same would be true for passengers.

In turn, the images 412 displayed on, by, or in front of the ceiling 304 would depict accurately a view from the vehicle looking generally upward—e.g., upward or at any angle between directly upward and toward the sides/front/rear, down to a point corresponding to where the ceiling 304 ends. Thus, the occupants can see a view showing the beyond-roof environment, as if the roof was not present, for the virtual convertible mode, and as if a sunroof was present, for the virtual sunroof mode.

Head Lamp and Tail Lamp Imaging Device(s)

The head lamp and tail lamp imaging devices $802^9$-$802^{12}$ can be positioned in any of various relationships vis-à-vis the head and tail lamps. In one embodiments, for instance, each is positioned, within, on, or adjacent its respective lamp. Each of these four imaging devices, like each imaging device 802 disclosed herein, is configured and arranged to collect and provide image data corresponding to any of a wide variety of perspectives depending, for example, on an angle and field of view of each. The data from each imaging device 802 can include one or more of forward (or fore) information, rearward (or aft information), skyward or upward information, lateral or side information, and in one embodiment even downward information.

Figure 9:
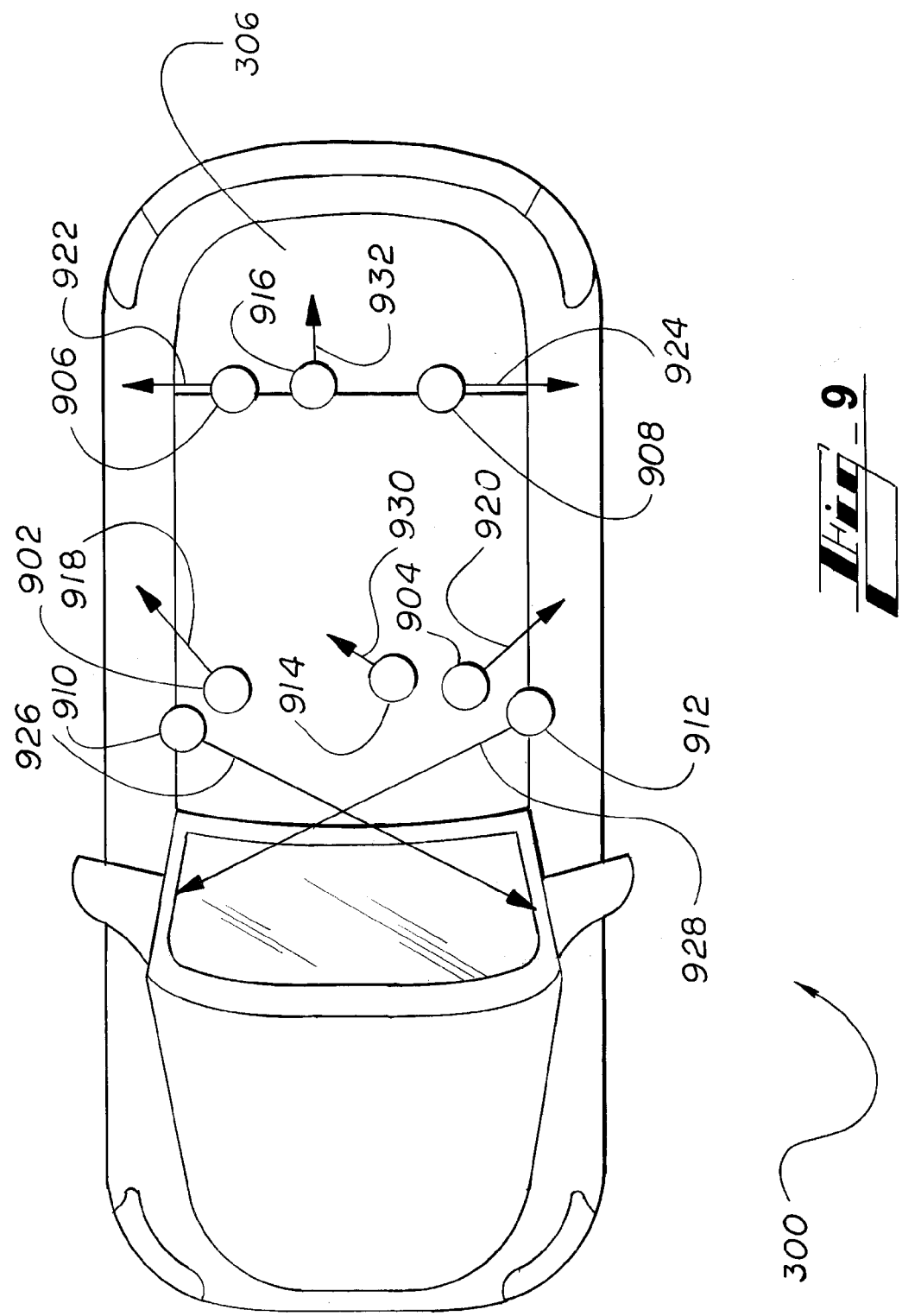
FIG. 9 is an interior view of the automobile showing locations of projectors used to display images on interior components of the automobile for creating the virtual convertible tops, virtual sun/moon roofs, and virtual back windows of the present technology.

FIG. 9—First Type of Image Formation—Projectors

In one embodiment, the image 412 (not shown in FIG. 9) described above is displayed on the subject surfaces by projection. The subject surfaces include, for example, any of the ceiling 304, the rear panel 306, the C pillar (3), the B pillar (2), the A pillar (1), door panels, etc.

FIG. 9 shows another interior view of the vehicle 300. The view of FIG. 9 shows, by way of example, eight (8) projectors 902-916 (e.g., video projectors) positioned at various positions within the vehicle 300. It will be appreciated that the vehicle 300 can include less than eight projectors (e.g., one-seven) or more than eight projectors in various embodiments.

Each projector is in either continued or selective communication, directly or indirectly, with one or more of the imaging devices (e.g., device 802). Each projector can communicate through wired and/or wireless communications with the imaging devices directly. For indirect communications between the projector and the imaging devices, the projector and the imaging device(s) communicate with an intermediate device such as a processor (e.g., controller 1000), through wired and/or wireless communications.

Contemplated positions for the projectors 902-916 include on or adjacent a driver headrest, on or adjacent a front passenger headrest or rear seat headrest, on or adjacent an armrest, on or adjacent a rearview mirror, and on or adjacent the ceiling 304, provided that there is no projection onto the passengers.

A wide variety of projector types may be used with the present technology. Example projector types include liquid crystal projectors, such as liquid crystal on silicon (LCoS or LCOS) projectors, and digital light processing (DLP) projectors.

Desired qualities of the projector include an ability to project the image 412 on the subject components (e.g., the ceiling 304 or interior of the rear panel 306) with sufficient strength and clarity to allow the driver or other occupant to see an accurate rendition, on, in, or in front of the component, of a beyond-component environment. The image 412 is provided to be clear and realistic under various expected lighting conditions, such as during a bright day.

The subject surfaces are in some embodiments covered partially or fully with one or more materials conducive to presenting the display 412 in a desired manner. For instance, the material can be a retroreflective or cataphote surface, designed to reflect light (e.g., generally back toward a source of the light) with a minimum scattering of the light.

The projector(s) 902-916 are configured and positioned to create the various images described herein—e.g., the image 412 on the ceiling 304 for the virtual sunroof or virtual convertible mode.

The projectors can be positioned with respect to existing or new vehicle parts in any of a wide variety of ways. For instance, each projector can be mounted on and/or within any existing vehicle part or a vehicle part (e.g., mounting bracket or other mounting component) provided at least in part for the purpose of connecting to the projector(s).

Example positions for the projectors include the driver and/or passenger headrests, such as to project onto the ceiling, forward, rearward, or laterally (e.g., onto the A, B, or C pillars), and/or rearward (e.g., onto the rear panel 306). Such positions are identified schematically in FIG. 9 by reference numerals 902, 904, 906, and 908. Example projection lines are shown schematically by reference numerals 918 (e.g., onto a ceiling and/or side (e.g., B-pillar, door panel, etc.) of the vehicle interior), 920 (e.g., onto a ceiling and/or side of the vehicle interior), 922 (e.g., onto a ceiling and/or side (e.g., C-pillar, door panel, etc.)), and 924 (e.g., onto a ceiling and/or side (e.g., C-pillar, door panel, etc.)). For projecting in various directions, the projector(s) can be at least partially positioned on a top, side, and/or back of the respective headrest.

Another example position for one or more projectors is at or adjacent a B-pillar. Such positions are identified schematically in FIG. 9 by reference numerals 910 and 912. For projecting in various directions, these projector(s) can be at least partially positioned on, for example, a lateral, front (fore), and/or rear (aft) side of the pillar. These projectors are in some embodiments used to project images onto another pillar (e.g., A-pillar, C-pillar, or other B-pillar), the ceiling, and/or the rear panel, for example. Example indications representing any of these projection lines are shown schematically in FIG. 9 by reference numerals 926 and 928 (e.g., onto a ceiling, opposite A-pillar, adjacent or opposite B-pillar, and/or other side component (e.g., door panel, etc.) of the vehicle interior).

In one embodiment, a projector 914 is ceiling mounted (positioned, e.g., on, in, or adjacent the ceiling). This positioning can be used to project image(s), forward, rearward, or laterally (e.g., onto the A, B, or C pillars), and/or rearward (e.g., onto the rear panel 306 or B or C pillars). An example projection line for this projector 914 (representing any one or more of the various potential projection lines for the projector 914, as is the case regarding the other example projection lines presented) is shown schematically by reference numeral 930. This projector 914, as with each shown in FIG. 9, is not limited to the position shown in the figure, as the position shown merely by way of example. The projector 914 can be, for instance, positioned more fore, aft, left or right of the position shown. Also, the projector 914, as with each shown in FIG. 9, is not limited to being a single projector. For instance, one or more projectors can be mounted on the ceiling regarding projector 914, more than one projector can be connected to the driver headrest regarding projector 904, etc.

In one embodiment, a projector 916 is positioned at a rear of the vehicle, such as at or adjacent a rear window (or rear panel) shelf area of the vehicle, such as at or behind a top of the rear seat. This positioning can be used to project image(s) upward, forward, rearward, and/or laterally (e.g., onto the ceiling or A, B, or C pillars). An example projection line for this projector 916 is shown schematically by reference numerals 932.

Second Type of Image Formation—Display Screen

In one embodiment, the image 412 described above is formed by a display screen. The screen used for the display is typically flexible so that it can conform generally to a shape of the component of the vehicle 300 over which it is positioned (e.g., pillar or ceiling).

For the purposes of this section, FIGS. 3-7 can be considered to show multiple display screens—FIGS. 3 and 5 in a default mode and FIGS. 4 and 6 in the virtual convertible mode, and FIG. 7 in the virtual sunroof mode. For instance, for the embodiments of this section, all of the subject vehicle interior components would be partially or fully covered by one or more display screens.

Various types of display screens can be used as the display screen(s) for the present technology. Example screens include thin-film transistor (TFT) screens, thin-film diode (TFD) screens, plasma panel screens, liquid-crystal display (LCD) screens, and electroluminescent (EL) screens, such as organic EL display screens (OLED).

Third Type of Image Formation—Holograph or Other 3D Presentation

For these embodiments, images would be acquired (e.g., in digital form) from one or more of the imaging devices 802 and displayed on one or more screens (not shown) designed for displaying holographic images.

Display screens that can produce three dimensional or holographic images, without requiring eye glasses, are placed on the ceiling and/or on one or more of the pillars. In some embodiments, the screens include small (e.g., pixel-sized) elements, such as dots or domes, that receive images from the projector(s) and render (e.g., deflect) the images toward the in-vehicle viewers so the viewers experience a three dimensional and/or holographic effect. The rendering (e.g., deflection) of the images as such can include providing the images toward the viewers so that distinct portions of the image, from slightly different angles, are provided toward the right eye of the viewer and portions are provided toward the left eye of the viewer. By presenting distinct portions of the images, e.g., taken from slightly different angles, to the right and left eyes, a stereoscopic image is created that the viewer's brain interprets as a three-dimensional object or view. In one embodiment, movement and position of the viewers' head and/or eyes are tracked and the projector(s) and/or the display screen(s) are adjusted accordingly to ensure a sharpness and clarity of the image provided to the viewer.

The image data and screen are configured and arranged to give the images an appearance of floating in space in front of the physical screen. The information (e.g., digital) is in one embodiment fed directly to the screen, and in another embodiments is fed to a laser or other projection device, to create this floating image.

Additional Inputs

In some embodiments, the vehicle receives external information, such as in digital form. The information may be received by a wireless communication component (not shown) of the vehicle, such as a cellular or other wireless transceiver. The communication standard(s) used can be long or short-ranged. An example long-range standard include those associated with cellular communications and satellite communications. Example short-range communication protocols include WI-FI®, BLUETOOTH®, infrared, infrared data association (IRDA), near field communications (NFC), Dedicated Short-Range Communications (DSRC), the like, and improvements thereof (WI-FI is a registered trademark of WI-FI Alliance, of Austin, Tex., and BLUETOOTH is a registered trademark of Bluetooth SIG, Inc., of Bellevue, Wash.). The extra-vehicle information can be received at the vehicle from any one or more of a wide variety of sources, including from another vehicle (e.g., via vehicle-to-vehicle (V2V) communications), a local business, such as one adjacent to the road on which the vehicle is travelling, a remote processing/monitoring system, such as the OnStar® system (OnStar is a registered trademark of OnStar, LLC, a subsidiary of the General Motors Corporation), databases (of a remote processing/monitoring system or otherwise), obstacle detection devices, collision avoidance devices, etc. The vehicle can also process information from on-board devices including on-board obstacle detection devices, collision avoidance devices, etc. Via the any of the communication channels described herein (e.g., WI-FI), the vehicle could connect to a global computer network (e.g., the Internet) for requesting and/or receiving information, such as from the entities described herein (e.g., adjacent establishment or business). In one embodiment, the input includes virtual images or other virtual information for use by the vehicle to present the virtual information with and/or selectively in place of real image data collected from the image devices 802. For instance, a virtual-reality effect can be created whereby a user sees actual images and virtual information together, such as by one being overlaid on or with the other. As a particular example, while the vehicle is driving through a downtown area, the image displayed on the ceiling of the vehicle for the virtual-sunroof mode could include or be supplemented with virtual information providing indications about a buildings or other item of interest, such as a name of the building, a height of the building, a name of a company in the building, etc. In one contemplated embodiment, the image (e.g., virtual sunroof or virtual convertible top includes solely) is formed entirely of virtual information (i.e., not re-presenting exact extra-vehicle image information).

In some embodiments, the vehicle receives additional information from a database of the vehicle. In various embodiments, the database:

is the computer-readable storage device 1008, described below;

includes the computer-readable storage device 1008; and is separate from the computer-readable storage device 1008.

Figure 10:
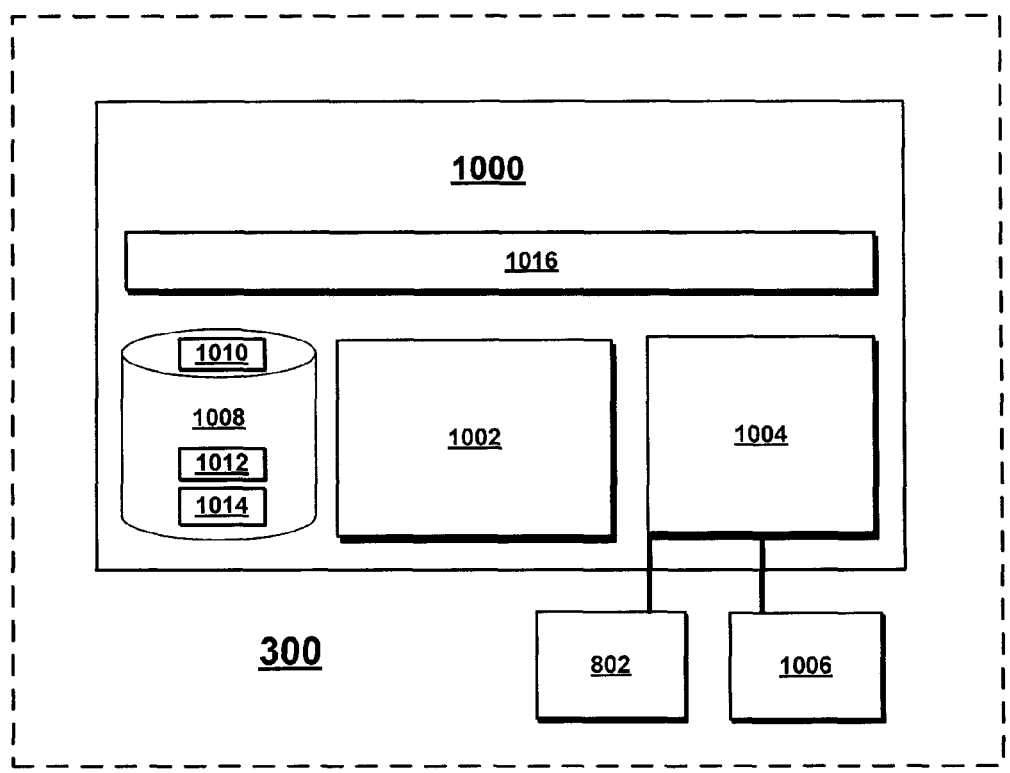
FIG. 10 is a block diagram of a computer processing system for use in the technology of the present disclosure.

FIG. 10—Overall System Including Controls

FIG. 10 shows a schematic view of the vehicle 300, including a controller or computer processing system 1000. The controller 1000 is shown as a single device but in some embodiments includes multiple pieces able to communicate with each other.

The controller 1000 includes a computing processor 1002 in communication with an input/output component 1004. The input/output component 1004 can selectively communicate with the imaging devices 802 and output components 1006. The output components 1006 could include, for example, the video projectors 1002-1010, the display screens, or holographic projectors described above.

The controller 1000 also includes a tangible, non-transitory computer-readable storage device, medium, or memory 1008. The memory 1008 stores computer-readable instructions 1010 configured to cause the processor 1002 to perform any or all of the functions described herein.

The memory 1008 also stores settings data 1012. The settings data 1012 can include, for example, manufacturer-set, system-set (e.g., processor 1102—set), and/or user-set data for controlling operation of the system. The operations controlled could include, for example, a manner by which visual data is collected (e.g., by the imaging devices) and image data presented—e.g., by the video projectors 902-910, the display screens, or holographic projectors described above.

The memory 1008 can also store image data 1014. The image data may include recent and/or older historic images taken by the imaging devices, such as that collected in a most recent second or fraction of a second. The data may be stored until, for example, it is retrieved for processing by the processor 1002 executing the instructions 1010.

The components of the controller 1000 can communicate with each other by a wired and/or wireless connection system or bus 1016. Similarly, as referenced above, the data sent from the imaging devices 802 and/or the data sent to display components 1006 can be sent by wire(s) and/or wirelessly.

As provided above, the controller 1000, and more particularly the processor 1002 executing the instructions 1010 could be configured to perform acts including: imaging device control, signal processing, data storage, image processing—e.g., cropping, adjusting size, skewing, brightness, and colors, and the like.

For imaging device control, the instructions 1010 can be configured to cause the processor 1002 to affect adjustable features of each imaging device 802, such as whether the imaging device 802 is on or off, a sensitivity of the imaging device (e.g., sensitivity to light), and a direction (or line or region of sight) of the imaging device 802.

For image processing, the instructions 1010 can be configured to cause the processor 1002 to consider information about the in-vehicle environment and/or outside environment. The information may include light levels and be collected from one or more sensors (e.g., light sensors), including and/or separate from the imaging devices 802. The instructions 1010 could cause the processor 1002 to distinguish between various conditions, such as a sunny day, an overcast day, and night, or variants thereof and/or therebetween. The instructions 1010 can be configured, for instance, to cause the processor 1002 to determine that it is night, or at least relatively dark, and so control the output device(s) 1006 accordingly to render a preferred quality of the image 412.

The image processing could also include controlling aspects of the output image 412, such as a size. Example distinctions of size include a size of the ceiling 304 for creating the virtual convertible and the size of a virtual sunroof. Other image output qualities include brightness, colors, and the like.

For data storage, the instructions 1010 can be configured to cause the processor 1002 to automatically or selectively receive, store, process, and transmit data described herein, such as image data and user settings data.

User settings data may indicate profile information and/or preferences for a first user of the vehicle. An example profile characteristic is a representation of a height, or head height of the first user when seated. The height characteristic can be used to tailor the image 412 so that it is accurate to the view of the first user based on their head or eye position in the vehicle 300. The settings data can include profile information for one or more other users.

The settings data can also include user preferences for the image 412, such as brightness (e.g., a preferred brightness level at night, during the day, or at all times).

Regarding control of system output, the instructions 1010 can be configured to cause the processor 1002 to control output components 1006, such as the video projectors 902-910, the display screens, or holographic projectors described above. The instructions also affect selective operation (e.g., on/off) of the various output devices, in any combination. In one embodiment, for example, the processor 1002 can create a virtual sunroof, create a virtual rear window, and eliminate the pillars (1), (2), (3), thereby forming a virtual floating ceiling having a sunroof.

The instructions 1010 causing the processor 1002 to affect the selective operation of the output component 1006 in some embodiments also cause the processor to consider user settings, such as user preferences. The instructions 1010 can also cause the processor 1002 to consider vehicle conditions, such as a height or level of incline, recline, etc. of a driver seat, and so thereby a position of the driver's head or eyes.

The instructions 1010 can also cause the processor 1002 to consider an exact head position and/or eye position, which can be sensed using one or more head or eye position sensors (not shown). In one embodiment, a certain portion of the image 412 (e.g., a portion covering the B pillar (2)) is effected only in response to a determination by the processor 1002 that the drivers head and/or eyes are, or are expect to be imminently, directed toward that portion (e.g., that B pillar (2)).

In a contemplated embodiment, the controller 1000 has one or more of the following associations:
- all or one or more of the components of the controller 1000 is/are a part of one or more imaging devices (e.g., devices 802); and
- all or one or more of the components of the controller 1000 is/are a part of one or more projection devices (e.g., projection devices 902, 904, etc.).

Additional Aspects

Other Virtual Bases

While the present technology is described herein primarily in connection with creating virtual effects over, on, or in the ceiling 304, rear panel 306, and various pillars (1), (2), (3), it is contemplated that the principles of the present technology can be used in connection with other components. The other components can include any solid features of the vehicle, such as all or portions of the doors, floor, dashboard, seats (e.g., rear seats), hood, and trunk lid. Corresponding imaging devices 802, including or beyond those shown expressly in FIG. 8, positioned accordingly, would be used. For example, the system could temporarily display, e.g., in response to the vehicle 300 being placed in reverse for driving backward, an image 412 showing what is behind a vehicle and beneath all, or at least beneath a rear portion, of the vehicle. The display would be provided toward a rear of the interior (e.g., on the rear panel 306 and rear seats), so that the driver, looking in the rear-view mirror or turning their head to look rearward, can see everything behind and beneath the vehicle, or at least behind and under a rear portion of the vehicle.

Virtual Retraction

The instructions 1010 could be configured to cause the processor 1002 to create in the display 412 select visuals. As an example, when the virtual convertible top mode is initiated, such as by in response to being triggered by driver voice or touch command, the image 412 initially includes a rendition of the ceiling 304, and the visual would then change to imitate an actual retraction of the roof 304/804, thereby slowly exposing the occupants to above-vehicle view via an entirety of the roof.

Similar virtual retraction can be presented with respect to the virtual sunroof mode. That is, when the virtual sunroof mode is initiated, such as by in response to being triggered by driver voice or touch command, the image 412 initially include a rendition of the ceiling 304 and sunroof (e.g., trim 702 (FIG. 7) and optionally a virtual inner cover) and the visual would then change to imitate an actual retraction of the virtual sunroof cover and/or glass, thereby slowly exposing the occupants to above-vehicle view, with or without virtual glass, via the virtual sunroof portion of the roof.

In one embodiment, the virtual sunroof is progressively displayed/removed, such as by fading it in/out in.

Benefits

The present technology allows vehicle occupants to experience many benefits of having a convertible top down, back window, and/or sunroof, open or closed, without the many downsides of having a convertible, rear window, and/or sunroof.

Virtual convertibles, back windows, and sunroofs provide a greater amount of privacy to vehicle occupants as compared to vehicles having its top down, back windows, and/or sunroofs. When an actual convertible top is down, e.g., passerby, on foot and in other vehicles, can easily see all of the persons and contents of the vehicle. To the contrary, with the virtual sunroof, the vehicle 300 would from the outside look like a typical, integral-roof vehicle.

The virtual convertible and sunroof allows occupants to view an overhead environment, including objects of interest or concern. The occupants can view these objects, including, for instance, hazardous tree limbs or power lines, while still being shielded from them, as compared to a conventional convertible with its top down.

Other objects viewable by way of the virtual convertible or sunroof include traffic lights (e.g., the light 5 shown in FIG. 6), people (e.g., the person 4 also shown in FIG. 6), landmarks (e.g., the buildings shown in FIGS. 4, 6 and 7), such as for use in navigating through an area, and items of interest, generally (e.g., monuments, skyscrapers, and aspects of nature (sun, clouds, trees, mountains, etc.)).

These and other benefits of using a virtual convertible, virtual back window, or virtual sunroof are available without decreasing a rigidity of body structure. In this way, safety and driving quality (e.g., ride and handling) are maintained at higher levels.

Vehicles having a virtual convertible, virtual back windows, or virtual sunroof are also protected more from external forces in the event of an accident compared to a vehicle having its top down, a back window, or its sunroof open. Even if an actual convertible vehicle, for example, has its top up, the top is generally less rigid or stiff than an integral roof, and so can still affect ride and handling and provide less over-head protection. The roofs of vehicles according to the present technology are also sealed and insulated better against noise, temperature, and moisture as compared to actual convertible tops and sunroofs, which transmit more sound, allow more unwanted heat transfer, and sometimes leak.

For the virtual sunroof embodiments of the present disclosure lacking an actual sunroof, the present vehicle has the benefits associated with having less glass. These benefits accrue to the virtual-rear-window embodiments, as well, and include avoiding the possibility of shattering and having less mass, as glass is much heavier than other vehicle materials, such as steel.

CONCLUSION

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A virtual-sunroof system, for providing a virtual sunroof at an interior of a vehicle for viewing by a passenger when the passenger is seated in the vehicle, comprising:
   a virtual-sunroof image-collection device configured and arranged at the vehicle to sense an environment above the vehicle and create digital image data using the image information, wherein the sensing is performed continuously over time and the digital image data is updated in real-time based on the continuous sensing and any changes of the environment being sensed; and
   a virtual-sunroof projection device configured and arranged in the vehicle to be in communication with the virtual-sunroof image-collection device for providing a virtual sunroof display that:
      is viewable above a head of the passenger seated in the vehicle, where a conventional sunroof would be positioned but is absent;
      is formed using the image data;
      represents accurately at the interior of the vehicle a rendition of the environment above the vehicle in real-time as the image data is updated; and
      has a size, shape, and location corresponding generally to a size, shape, and location that an actual conventional-type sunroof would have in the vehicle.

2. The virtual-sunroof system of claim 1, wherein:
   the virtual-sunroof system further comprises:
      a processor; and
      a computer-readable storage device having instructions that, when executed by the processor, cause the processor to perform a method comprising:
         receiving the image data from the virtual-sunroof image-collection device;
         processing the image data to form processed image data; and
         providing the processed image data post processing to the virtual-sunroof display device for providing the virtual sunroof;
   the virtual-sunroof projection device, in being configured and arranged in the vehicle to be in communication with the virtual-sunroof image-collection device is configured to be in communication with the virtual-sunroof image-collection device by way of the processor; and
   the virtual-sunroof projection device, in being configured and arranged in the vehicle to provide the display formed using the image data, is configured and arranged in the vehicle to provide the display formed using the processed image data.

3. The virtual-sunroof system of claim 2, wherein the operation of processing the image data comprises adding virtual information to the image data to form the processed image data.

4. The virtual-sunroof system of claim 3, wherein the operations further comprise receiving the virtual information from a source remote to the vehicle.

5. The virtual-sunroof system of claim 4, wherein the operation of receiving the virtual information from a source remote to the vehicle comprises receiving the virtual information from a source selected from a group of sources consisting of:
   a remote customer-service center;
   an entity near the vehicle; and
   a global communications network.

6. The virtual-sunroof system of claim 4, wherein the operation of receiving the virtual information from a source remote to the vehicle comprises receiving the virtual information using a communication technology selected from a group of communication technologies consisting of:
   a long-range communications standard; and
   a short-range communications standard.

7. The virtual-sunroof system of claim 3, wherein the operations further comprise obtaining the virtual information from a database of the vehicle.

8. The virtual-sunroof system of claim 3, wherein the operation of adding the virtual information to the image data comprises adding to the image data virtual information that is related to an item of the environment above the vehicle sensed by the virtual-sunroof image-collection device.

9. The virtual-sunroof system of claim 3, wherein the operation of adding the virtual information to the image data comprises adding to the image data virtual information including text related to the environment.

10. The virtual-sunroof system of claim 2, wherein the processor and computer-readable storage device are parts of:
   the virtual-sunroof image-collection device; or
   the virtual-sunroof projection device.

11. The virtual-sunroof system of claim 1, wherein the virtual-sunroof image-collection device includes at least one device selected from a group of devices consisting of:

a device capable of creating three-dimensional image data;
a charge coupled device;
an infra-red device;
a light detection and ranging device; and
a radio detection and ranging device.

12. The virtual-sunroof system of claim 1, wherein the virtual-sunroof projection device, in being configured and arranged in the vehicle to provide the virtual-sunroof display, is configured and arranged in the vehicle to provide the virtual-sunroof display having a virtual sunroof cover.

13. A virtual-convertible-top system, for providing a virtual convertible top at an interior of a vehicle for viewing by a passenger when the passenger is seated in the vehicle, comprising:
   a virtual-convertible-top image-collection device configured and arranged at the vehicle to sense an environment above the vehicle and create, based on the sensing, digital image data using the image information, wherein the sensing is performed continuously over time and the digital image data is updated in real-time based on the continuous sensing and any changes of the environment being sensed; and
   a virtual-convertible-top projection device configured and arranged in the vehicle to be in communication with the virtual-convertible-top image-collection device for providing a virtual-convertible-top display that:
      is viewable above a head of the passenger seated in the vehicle, where the environment would be visible directly if the vehicle had a conventional convertible top down;
      is formed using the image data; and
      represents accurately, at the interior of the vehicle, a rendition of the environment above the vehicle in real-time as the image data is updated.

14. The virtual-convertible-top system of claim wherein:
the virtual-convertible-top system further comprises:
   a processor; and
   a computer-readable storage device having instructions that, when executed by the processor, cause the processor to perform operations comprising:
      receiving the image data from the virtual-convertible-top image-collection device;
      processing the image data to form processed image data; and
      providing the processed image data to the virtual-convertible-top display device for providing the virtual convertible top;
the virtual-convertible-top projection device, in being configured and arranged in the vehicle to be in communication with the virtual-convertible-top image-collection device is configured to be in communication with the virtual-convertible-top image-collection device by way of the processor; and
the virtual-convertible-top projection device, in being configured and arranged in the vehicle to provide the display formed using the image data, is configured and arranged in the vehicle to provide the display formed using the processed image data.

15. The virtual-convertible-top system of claim 14, wherein the operation of processing the image data comprises adding virtual information to the image data to form the processed image data.

16. The virtual-convertible-top system of claim 15, wherein the operations further comprise receiving the virtual information from a source remote to the vehicle.

17. The virtual-convertible-top system of claim 15, wherein the operation of adding the virtual information to the image data comprises adding to the image data virtual information related to an item of the environment above the vehicle sensed by the virtual-convertible-top image-collection device.

18. The virtual-convertible-top system of claim 13, wherein:
   the image information is first image information;
   the image data is second image data;
   the virtual-convertible-top image-collection device is configured and arranged at the vehicle to collect second image information from an environment lateral of the vehicle and create second digital image data using the second image information; and
   the virtual-convertible-top projection device is configured and arranged in the vehicle to, in providing the virtual-convertible-top display;
      provide a first part of the display, formed using the first image data, on or adjacent a ceiling of the vehicle, to represent the environment above the vehicle; and
      provide a second part of the display, formed using the second image data, on or adjacent a component of the vehicle other than the ceiling of the vehicle, to represent the environment lateral of the vehicle.

19. A computer-readable storage device comprising instructions that, when executed by a processor, cause the processor to perform operations, for providing a virtual overhead display for viewing by a passenger seated in a vehicle, comprising:
   receiving, from an image-collection device, overhead image data representing visual qualities of an environment above the vehicle, wherein the overhead image data is received continuously over time, and so representing over time any changes to the above-vehicle environment;
   processing the overhead image data to form processed overhead image data; and
   providing the processed overhead image data to a display device for use by the display device to provide the virtual overhead display, in real-time as the image data is updated in response to changing of the above-vehicle environment, to be viewable by the passenger seated in the vehicle.

20. The computer-readable storage device of claim 19 wherein:
   the operation of processing the overhead image data to form processed image data comprises adding virtual information to the overhead image data to form the processed overhead image data; and
   the operations further comprise obtaining the virtual information from a source selected from a group of sources consisting of:
      a source remote to the vehicle;
      a database of the vehicle; and
      a global computer network.

* * * * *